United States Patent
Saito et al.

[11] Patent Number: 6,138,481
[45] Date of Patent: Oct. 31, 2000

[54] GLASSROD ELONGATION HEATING FURNANCE HAVING DOUBLE BELLOWS

[75] Inventors: Tatsuhiko Saito; Tomomi Moriya, both of Yokohama, Japan

[73] Assignee: Sumitomo Electric Industries, Inc., Osaka, Japan

[21] Appl. No.: 09/175,364

[22] Filed: Oct. 20, 1998

[30] Foreign Application Priority Data

Jan. 27, 1998 [JP] Japan .................................. 10-014044

[51] Int. Cl.⁷ .................................................. C03B 37/029
[52] U.S. Cl. .............................. 65/537; 117/215; 117/218
[58] Field of Search .............................. 65/537; 117/215, 117/218, 217

[56] References Cited

U.S. PATENT DOCUMENTS

| | | | |
|---|---|---|---|
| 4,201,746 | 5/1980 | Burd | 117/217 |
| 4,204,856 | 5/1980 | Yigdall | 65/347 |
| 4,360,499 | 11/1982 | Gubitose | 117/215 |
| 4,824,514 | 4/1989 | Ostrog | 117/215 |
| 4,906,268 | 3/1990 | Lane | 65/537 |

FOREIGN PATENT DOCUMENTS

| | | |
|---|---|---|
| 53-24429 | 3/1978 | Japan . |
| 61-191536 | 8/1986 | Japan . |
| 2-51440 | 2/1990 | Japan . |
| 6-256034 | 9/1994 | Japan . |

*Primary Examiner*—John Hoffmann
*Attorney, Agent, or Firm*—Pillsbury Madison & Sutro LLP

[57] ABSTRACT

In a heating furnace which holds at least one end of a glass rod with a holding portion and elongates the glass rod by softening the glass rod successively from the other end portion thereof with heating while applying a tensile force thereto, the heating furnace comprises a tubular portion through which the glass rod to be elongated is inserted such as to be longitudinally movable; heater, positioned within the tubular portion such as to circumferentially surround the glass rod, for heating the glass rod; a moving portion through which one end of the glass rod is inserted; bellows the ends of which are respectively secured to the moving portion and the tubular portion and which is longitudinally expandable and contractible and composed of at least a double cylinder surrounding the part of the glass rod such as to block an outside air from flowing into the heating furnace; and gas supply line for supplying, for purging, an inert gas into a space within the tubular portion and the inner bellows as well as the space between inner and outer bellows.

4 Claims, 4 Drawing Sheets

Fig.3 *(PRIOR ART)*

GLASSROD ELONGATION HEATING FURNANCE HAVING DOUBLE BELLOWS

BACKGROUND OF THE INVENTION

1. Field of the Invention

The present invention relates to a heating furnace for elongating a glass rod such as optical fiber glass preform, and a method of elongating a glass rod.

2. Related Background Art

Generally known as a heating furnace for elongating a glass rod such as optical fiber glass preform is the one in which, as shown in FIG. 3, a glass rod 101 is heated and softened successively from the lower end side such as to be elongated. In this heating furnace, dummy rods 102 connected to both ends of the glass rod 101 are held with chucks 103A and 103B, respectively, and these chucks 103A and 103B are moved down such that the lower chuck 103B moves faster than the upper chuck 103A. The glass rod 101 is heated by a heater 107 from its lower end side, and is elongated by a tensile force which occurs due to the speed difference between the chucks 103A and 103B.

If oxygen intrudes into the heating furnace, carbon-based parts within the heating furnace such as the heater 107 and muffle tube 109 will deteriorate due to oxidization. For preventing such deterioration, the inside of the heating furnace is usually purged by an inert gas when elongating the glass rod 101.

In such a heating furnace, in order to prevent the outside air from intruding into the heating furnace and secure the elongating of the whole glass rod 101, the upper dummy rod 102 and a cylindrical portion 106A must have such a length that securely assures the longitudinal movement of the glass rod 101. Further, above the cylindrical portion 106A, it is necessary to secure a movable area for the chuck 103A holding the dummy rod 102, which would disadvantageously increase the size of the heating furnace as a whole. Hence,there has been employed a heating furnace which uses, instead of the cylindrical portion 106A, a bellows which expands and contracts depending on the movement of the glass rod as disclosed in Japanese Patent Application Laid-Open No. 6-256034, No. 2-51440, No. 61-1914536, No. 53-24429, and the like. FIG. 4 shows an example of a heating furnace having such a bellows. In the heating furnace in FIG. 4, constituent parts identical or equivalent to those in the heating furnace shown in FIG. 3 are referred to with numerals or letters identical thereto.

SUMMARY OF THE INVENTION

As shown in FIG. 4, in the heating furnace using a bellows 106B, it is sufficient for dummy rods 102 to have such a length that the glass rod 101 can securely pass through a muffle tube 109, whereby the dummy rods 102 themselves can be made shorter than those in the heating furnace in FIG. 3. Further, since the movable area of the chuck 103A coincides with the expansion area of the bellows 106B, the initial position of the chuck 103A can be made close to the muffle tube 109, thereby downsized heating furnace as a whole can be supplied.

In such a heating furnace using the bellows 106B, however, the inventors have noticed that oxygen cannot effectively be prevented from intruding into the heating furnace even when a sufficient airtightness is secured at the part where the bellows 106B is attached.

As a result of diligent studies, the inventors have found that, when a bellows is used, oxygen intrudes into the heating furnace since oxygen molecules permeates through the bellows. Also, the inventors have found that the amount of oxygen molecules permeating through a bellows depends on difference between the oxygen concentration of one side of the bellows and that of the other side. In view of these findings, it is an object of the present invention to provide a heating furnace and method for elongating a glass rod, which enable to restrain the deterioration of the carbon-based parts such as heater and a muffle tube inside the furnace while elongating the glass rod, thereby improving their durability.

The heating furnace for elongating a glass rod in accordance with the present invention comprising a tubular portion through which the glass rod to be elongated is inserted such as to be longitudinally movable; heating means, positioned within the tubular portion such as to circumferentially surround the glass rod, for heating the glass rod; a moving portion through which one end of the glass rod is inserted; an expandable member the ends of which are respectively secured to the moving portion and the tubular portion and which is longitudinally expandable and contractible and composed of at least a double cylinder surrounding the part of the glass rod such as to block an outside air from flowing into the heating furnace; and gas supply means for supplying, for purging, an inert gas into the space within the tubular portion and the inner cylinder of the expandable member as well as the space between the inner and outer cylinders of the expandable member.

In the heating furnace for elongating a glass rod in accordance with the present invention, the expandable member is arranged in at least a double structure, i.e., multiple bellows. An inert gas is supplied to the space within the tubular portion and the inner bellows as well as the space between the inner and outer bellows. Though the amount of oxygen molecules permeating through a bellows depends on difference between the oxygen concentration of one side of the bellows and that of the other side as mentioned above, according to the present invention, the oxygen concentration difference between inside and outside of each bellows is reduced so that the amount of oxygen molecules permeates through each bellows is reduced. Consequently, the amount of oxygen molecules reaching the space within the heating furnace is remarkably lowered. And the carbon-based parts within the heating furnace can be prevented from deteriorating. Further, using bellows as airtight structure the apparatus can have a compact configuration.

Preferably, the gas supply means is adapted to independently control the amount of the inert gas supplied to the space within the tubular portion and the inner bellows and the amount of the inert gas supplied to the space between the inner and outer bellows.

In this case, the oxygen concentration in each space can appropriately be controlled, whereby the amount of the oxygen penetrating into the heating furnace as well as the amount of use of the inert gas can be suppressed.

Preferably, the gas supply means is adapted to control the amount of supply of the inert gas to the space within the tubular portion and the inner bellows and/or the space between the inner and outer bellows in response to the expansion and contraction of the bellows.

The volume of each space would change in response to the expansion and contraction of the bellows. Hence, when the amount of supply of the inert gas is controlled in response to the change in volume, the oxygen concentration in each space can be controlled further appropriately.

Preferably, the innermost bellows has a heat resistance over 200° C.

Since the inner bellows is heated by a radiant heat from the heated glass rod, securing a predetermined heat resistance prevents the inner bellows from being damaged by heating, thus making it possible to effectively keeping oxygen from intruding into the heating furnace.

Preferably further provided inside the innermost component of the expandable member is an expandable muffle tube which surrounds the glass rod and expands and contracts in synchronization with the expansion and contraction of each component of the expandable member as the moving portion moves.

In this case, the expandable muffle tube receives the radiant heat from the heated glass rod, whereby the inner bellows can be prevented from being directly heated. As a consequence, in a similar fashion, the inner bellows can be prevented from being damaged by heating, thus making it possible to effectively keep oxygen from intruding into the heating furnace.

Preferably, a water passage for guiding a coolant is formed within or on a surface of the expandable muffle tube, and the water passage is connected to a circulation mechanism for circulating the coolant.

In this case, the expandable muffle tube is cooled by the coolant. As a consequence, the inner bellows is restrained from being indirectly heated via the expandable muffle tube, whereby the possibility of the inner bellows being damaged by heating can further be suppressed, and oxygen can more effectively be prevented from intruding into the heating furnace.

On the other hand, the method of elongating a glass rod in accordance with the present invention comprises the steps of inserting the glass rod into the above-mentioned heating furnace; supplying an inert gas to the space surrounding the glass rod and the space between the inner and outer bellows; and, while adjusting the amount of inert gas supplied by the gas supply means such as to maintain an oxygen concentration not greater than 2% in the space between the inner and outer bellows, elongating the glass rod by heating to soften the glass rod with a heat applied thereto by the heating portion as the glass rod is passed through the heating furnace with a tensile force being added to the glass rod.

When the oxygen concentration in the space between the inner and outer bellows is kept at 2% or less, the amount of oxygen intruding into the heating furnace via the innermost component is reduced, whereby the oxygen concentration within the heating furnace can securely be suppressed to a predetermined concentration or less, at which the carbon-based parts do not deteriorate. When the glass rod is elongated under this condition, fine particles occurring as the carbon-based parts deteriorate are prevented from attaching to the glass rod, whereby a elongated body having a favorable quality can be prepared.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

An embodiment of the heating furnace for elongating a glass rod in accordance with the present invention will be explained with reference to FIG. 1.

Figure 1:
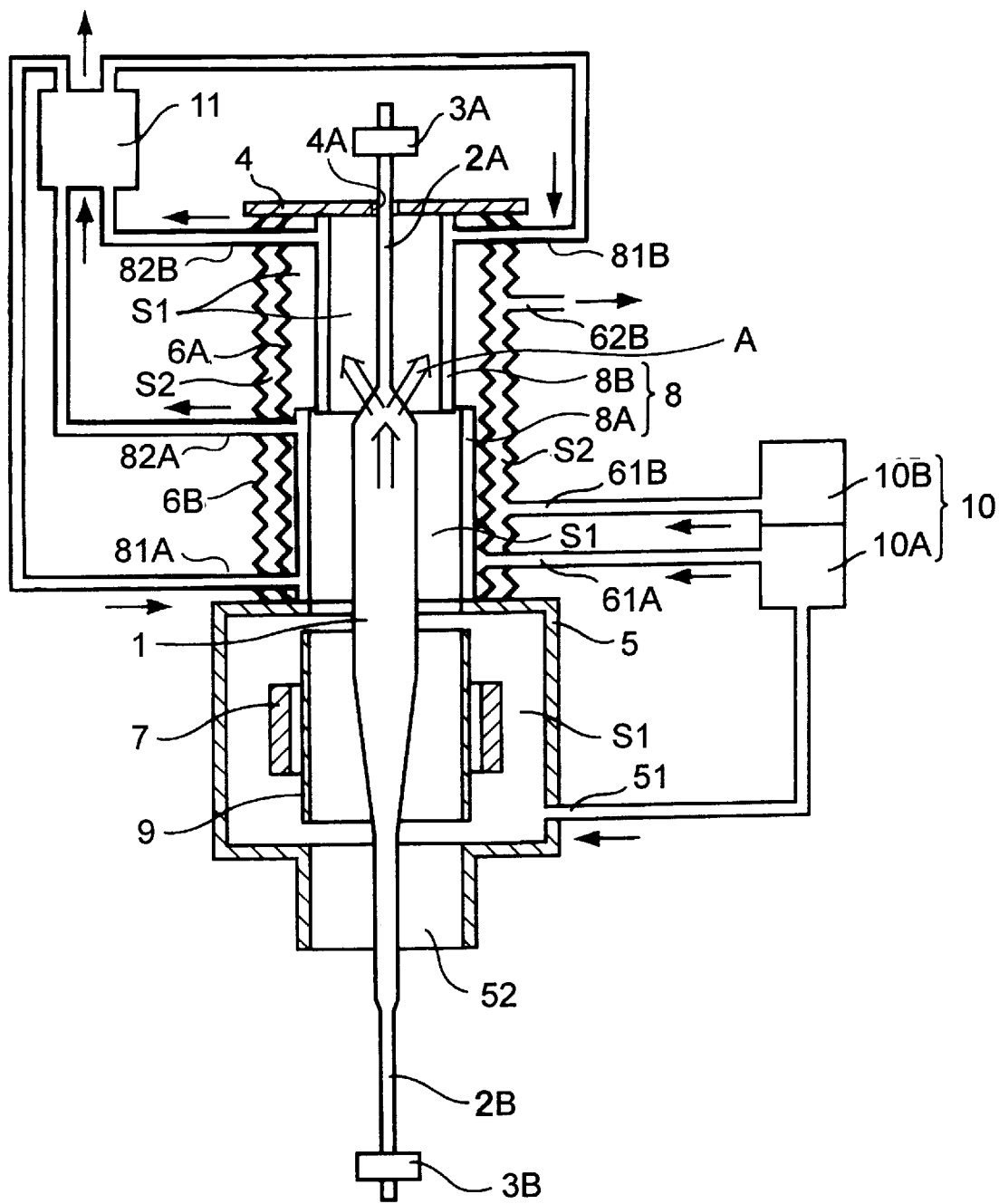
FIG. 1 is a sectional view showing an embodiment of a heating furnace for elongating a glass rod in accordance with the present invention.

FIG. 1 shows a state that a glass rod 1 is being elongated. The glass rod 1 is softened in the vicinity of its center with heating by a heater 7 which is a heating means. Thus heated and softened portion is elongated, while being naturally cooled therebelow to be solidified. The glass rod 1 is held by way of dummy rods 2A and 2B respectively connected to either ends thereof.

The upper dummy rod 2A is held with an upper chuck 3A which is a holding portion, whereas the lower end of the lower dummy rod 2B is held with a lower chuck 3B. Namely, both ends of the glass rod 1 are held with the chucks 3A and 3B via the dummy rods 2A and 2B, respectively. The upper and lower chucks 3A and 3B are connected to their driving motors, which are not depicted, and are driven up and down in FIG. 1 by these motors. The driving motors are connected to a control unit, which is not depicted, and control the vertical moving speeds of the upper and lower chucks 3A and 3B according to a signal from the control unit.

Disposed between the upper and lower chuck 3A and 3B is a tubular portion 5 through which the glass rod 1 is inserted. The above-mentioned heater 7 is fixedly disposed within the tubular portion 5. Attached onto the upper face of the tubular portion 5 are an inner bellows 6A, which is an inner cylindrical expandable member, and an outer bellows 6B, which is an outer cylindrical expandable member; whereas the lower face of the tubular portion 5 is formed with an opening 52.

The heater 7 has a cylindrical form and heat to soften the glass rod 1 inserted into the center thereof. Disposed inside the heater 7 is a muffle tube 9 for preventing fine particles dissipated from the heater 7 from attaching to the glass rod 1. As the heater 7, the one employing electric resistance heating or high-frequency induction heating is used. Though depending on the outside diameter of the glass rod 1, a burner may be used in place of the heater as a heating means as long as it can fully soften the glass rod 1.

Disposed in the lower vicinity of the upper chuck 3A is a moving portion 4, which is arranged to move so as not to touch the upper chuck 3A. The moving portion 4 is a disc-shaped member having an insertion hole 4A at the center thereof for inserting therein the dummy rod 2A. The insertion hole 4A and the dummy rod 2 are arranged such that airtightness can be secured therebetween by the inert gas for purging.

The above-mentioned inner bellows 6A and outer bellows 6B extend from the lower face of the moving portion 4 to the upper face of the tubular portion 5. The upper ends of the inner bellows 6A and outer bellows 6B are attached to the moving portion 4 in the state where airtightness is sufficiently secured. Similarly, the lower ends of the inner bellows 6A and outer bellows 6B are attached to the tubular portion 5 in the state where airtightness is sufficiently secured. Each of the inner bellows 6A and outer bellows 6B is formed from a sheet-like member turned into a cylindrical bellows, and is expandable and contractible in the vertical direction in FIG. 1. As the sheet-like member forming the inner bellows 6A and outer bellows 6B, a multilayer laminate made of a synthetic resin sheet and a metal sheet may be used, for example.

The inner bellows 6A is joined to a pipe 61A, which is connected to a first gas supplier 10A which is a gas supply means. The tubular portion 5 is joined to a pipe 51, which is also connected to the first gas supplier 10A. The first gas supplier 10A is adapted to supply an inert gas such as nitrogen gas, for purging, into a furnace inner section SI within the tubular portion 5 and inner bellows 6A via the pipes 51 and 61A.

The outer bellows 6B is disposed such as to surround the inner bellows 6A, while forming a space S2 between the inner bellows 6A and the outer bellows 6B. The bellows 6B is joined to a pipe 61B, which is connected to a second gas supplier 10B which is a gas supplying means. The second gas supplier 10B is adapted to supply an inert gas such as nitrogen gas, for purging, into the space S2.

The above-mentioned first gas supplier 10A and second gas supplier 10B (hereinafter also collectively referred to as gas supplier 10), which are gas supplying means, are connected to a control unit which is not shown. The gas supplier 10 controls the amounts of inert gas supply to the furnace inner section S1 and space S2 according to a signal from the control unit. Also, the outer bellows 6B is joined to a pipe 62B for discharging the inert gas from the space S2. The pipe 62B is connected to a discharge mechanism which is not shown.

Disposed inside the above-mentioned inner bellows 6A is an expandable muffle tube 8 adapted to change its length as the inner bellows 6A expands and contracts. The expandable muffle tube 8 is constituted by an outer muffle tube 8A and an inner muffle tube 8B, and changes its whole length as the inner muffle tube 8B is inserted inside the outer muffle tube 8A.

Formed within the expandable muffle tube 8 are water passages for circulating a coolant. These water passages are connected to a pump 11, which is a circulation mechanism, by way of pipes 81A, 81B, 82A, and 82B. The pump 11 is connected to a control unit which is not shown, and is driven according to a signal from the control unit. The pump 11 supplies the coolant to the outer muffle tube 8A via the pipe 81A, and collects the coolant from the outer muffle tube 8A via the pipe 82A. Similarly, the pump 11 supplies the coolant to the inner muffle tube 8B via the pipe 81B, and collects the coolant from the inner muffle tube 8B via the pipe 82B. Here, the pipes 81B and 82B are arranged such as to circulate the coolant even when the inner muffle tube 8B is moved down.

An embodiment of the method of elongating a glass rod in accordance with the present invention using the above-mentioned heating furnace will now be explained.

When elongating the glass rod 1, each of the upper chuck 3A and lower chuck 3B is moved down. Here, the lower chuck 3B moves faster than the upper chuck 3A, and the resulting speed difference applies a tensile force to the glass rod 1. The glass rod 1 is successively inserted into the heater 7 and muffle tube 9 from its lower end side, thus being heated by a heat added thereto by the heater 7 and, consequently, being softened. Thus softened portion is elongated while attaining a tapered form as being extended by the above-mentioned tensile force. The elongated portion of the glass rod 1 comes out of the heater 7 and muffle tube 9, where it is solidified by being naturally cooled.

In the elongating process of the glass rod 1, the first gas supplier 10A supplies an inert gas to the furnace inner section S1 for purging. The inert gas supplied to the furnace inner section S1 by the first gas supplier 10A travels by way of the pipes 51 and 61A, and overflows from the opening 52 at the lower part of the tubular portion 5. The oxygen concentration of the inert gas supplied to the furnace inner section S1 for purging is set to several ppm (substantially 0%) in order to prevent the carbon-based parts disposed within the furnace inner section S1 from deteriorating. The oxygen concentration in the furnace inner section S1, though becoming slightly greater than that of the inert gas for purging due to the air convolutedly introduced from the opening 52 and the like, is kept at several tens of ppm (substantially 0%).

In parallel with the inert gas supply to the furnace inner section S1 for purging, the second gas supplier 10B supplies the inert gas to the space S2 for purging, and the oxygen concentration in the space S2 is kept at 2 vol % or less.

In the elongating process of the glass rod 1, the upper chuck 3A moves down in FIG. 1 as the elongating of the glass rod 1 advances. The moving portion 4 also moves down such as to follow the downward movement of the upper chuck 3A, thereby contracting the inner bellows 6A and the outer bellows 6B. Also, in line with the contraction of the inner bellows 6A and outer bellows 6B, the inner muffle tube 8B is inserted inside the outer muffle tube 8B, thus contracting the expandable muffle tube 8 as a whole.

To the water passages within the expandable muffle tube 8, a coolant is supplied from the pump 11 via the pipes 81A and 81B, and the coolant which has absorbed the heat radiated from the glass rod 1 is collected by the pump 11 via the pipes 82A and 82B. The collected coolant, after the temperature thereof is lowered, is supplied to the expandable muffle tube 8 again via the pipes 81A and 81B, such as to absorb the heat radiated from the glass rod 1.

As mentioned above, the diligent studies conducted by the inventors have revealed that oxygen can permeate through a bellows and that the amount of permeation becomes greater as difference between the oxygen concentration of one side of the bellows and that of the other side increases. In the heating furnace of the above-mentioned embodiment and the elongating method of the above-mentioned embodiment, the bellows has a double structure constituted by the inner bellows 6A and outer bellows 6B, while yielding a space S2 therebetween, and the oxygen concentration in this space S2 is kept at 2 vol % or less. As a consequence, the amount of permeation of oxygen to the furnace inner section S1 is reduced, whereby the carbon-based parts within the furnace inner section S1 can be restrained from deteriorating, thus the durability of the heating furnace improves. Also, as the carbon-based parts within the furnace inner section S1 are prevented from deteriorating, the fine particles occurring upon deterioration of the carbon-based parts can be prevented from attaching to the surface of the glass rod 1 and worsening the quality of the glass rod 1 after being elongated.

Furthermore, the heating furnace according to the above-mentioned embodiment can be made smaller because the inner and outer bellows 6A and 6B are extendible between the moving portion 4 and the tubular portion 5, and the muffle tube 8 is also expandable.

Further, in the heating furnace of the above-mentioned embodiment, the first gas supplier 10A and the second gas supplier 10B are independently disposed as the gas supplying means. As a consequence, an inert gas can independently be supplied to the furnace inner section S1 and the space S2 for purging, thus the respective oxygen concentrations in the furnace inner section S1 and space S2 can be controlled independently. As a result, the furnace inner section S1 and the space S2 can be controlled such as to attain their respective optimal oxygen concentrations, whereby the amount of transmission of oxygen from the space S2 to the furnace inner section S1 via the inner bellows 6A can be reduced more efficiently.

Here, the oxygen concentration in the space S2 is preferably as low as possible. From the viewpoint of restraining oxygen from permeation through the inner bellows 6A, however, it is not necessary for the oxygen concentration in the space S2 to be as low as that in the furnace inner section S1. Since the optimal oxygen concentration differs between the furnace inner section S1 and the space S2, it will be advantageous if the supply of the inert gas to the furnace inner section S1 for purging and the supply of the inert gas to the space S2 for purging can be controlled independently. Also, when the supply of the inert gas to the furnace inner section S1 for purging and the supply of the inert gas to the space S2 for purging can be controlled independently, the amount of use of inert gas can be minimized, thereby allowing the inert gas to be utilized effectively.

In the heating furnace of the above-mentioned embodiment, the gas supplier 10 not only can independently control the amounts of gas supplied to the furnace inner section S1 and space S2, but also can change the amounts of gas supplied to the furnace inner section S1 and space S2 in response to the expansion and contraction of the inner bellows 6A and outer bellows 6B. The inner bellows 6A and outer bellows 6B are contracted when the glass rod 1 is elongated and are expanded when returning to their initial condition after the elongating, whereby the volumes of the furnace inner section S1 and space S2 would vary from moment to moment. When the amount of gas supplied to the furnace inner section S1 and the amount of gas supplied to the space S2 can be controlled independently of each other in response to the expansion and contraction of the inner bellows 6A and outer bellows 6B (i.e., changes in volume of the furnace inner section S1 and space S2), the oxygen concentrations in the furnace inner section S1 and space S2 can be kept in their respective optimal states notwithstanding the changes in volume of the furnace inner section S1 and space S2.

As indicated by arrows "A" in FIG. 1, the heat imparted by the heater 7 for melting the glass rod 1 upon heating is propagated through the inside of the glass and is radiated about the glass rod 1 as a radiant heat. In particular, a locally large amount of radiant heat is radiated around the vicinity of the tapered portion formed at an end part of the glass rod 1. As a consequence, when the inner bellows 6A does not have a sufficient heat resistance, it is likely to be damaged as being heated by this radiant heat, whereby the oxygen concentrations in the furnace inner section S1 and space S2 cannot be kept in their optimal states. In the heating furnace of the above-mentioned embodiment, since the inner bellows 6A has a heat resistance over 200° C., the inner bellows 6A can be prevented from being damaged by the radiant heat from the glass rod 1, thus the oxygen concentrations of the furnace inner section S1 and space S2 can be kept in their optimal states.

Also, when the glass rod 1 has a small size, there are cases where the temperature of the highest temperature portion of the inner bellows 6A is higher than the room temperature by only about 100° C. Hence, the heating furnace of the above-mentioned embodiment may also be configured such that no expandable muffle tube 8 is provided or such that the expandable muffle tube 8 is not water-cooled. In such a configuration, though the heat radiated from the glass rod 1 is absorbed by the inner bellows 6A alone, the inner bellows 6A can sufficiently meet this condition if it has a heat resistance over 200° C. In other words, in such a case, it is particularly important for the inner bellows 6A to have a heat resistance over 200° C.

As the glass rod 1 has a larger diameter, however, the heat radiated from the glass rod 1 to its surroundings becomes greater, whereby there are cases where the temperature of the highest temperature portion of the inner bellows 6A is higher than the room temperature by as much as about 700° C. In such a case, simply improving the heat resistance of the inner bellows 6A itself may not satisfactorily meet the condition. When the expandable muffle tube 8 is disposed inside the inner bellows 6A, the former can receive the radiant heat from the glass rod 1, thereby preventing the inner bellows 6A from being unnecessarily heated, and securely keeping the inner bellows from being damaged due to overheating. Consequently, the oxygen concentrations in the furnace inner section S1 and space S2 can be kept in their optimal states.

Further, in the heating furnace of the above-mentioned embodiment, water passages for circulating a coolant are formed within the expandable muffle tube 8, and these water passages are connected to the pump 11. As a consequence, even when a larger amount of radiant heat is radiated from the glass rod 1, the expandable muffle tube 8 can be kept from being overheated, and the inner bellows 6A can more securely be prevented from being damaged due to overheating by the radiant heat from the outer surface of the expandable muffle tube 8, thus the oxygen concentrations of the furnace inner section S1 and space S2 can be maintained at their optimal states. Here, it is needless to mention that not only the inside but also the surface or the like of the expandable muffle tube 8 may be formed with the water passages for the coolant.

The inventors actually investigated and verified the permeation phenomenon of oxygen molecules through a bellows. The investigation and verification will be explained in the following.

A sheet material, having a material and size actually employed in a bellows for a heating furnace, [manufactured by Nippon Jabara Kogyo Co., Ltd.; in which, successively from the inside of the furnace, GTX#1018 (aluminum-coated ultra-heat-resistant cloth) having a thickness of 0.5 mm, IGM#3000 (glass cloth insulator) having a thickness of 2.0 mm, and SRCC (Nomex silicone cloth) having a thickness of 0.5 mm were laminated, with a surface area of about 6.5 $m^2$] was used for measuring the amount of oxygen permeation. When the amount of oxygen permeation was measured while the oxygen concentrations outside and inside this sheet material were set to 20% (normal oxygen concentration of the air) and 0%, respectively, it was found that 0.025 liter/min of oxygen gas permeated through the bellows in the standard temperature and pressure. This result indicates that, if nitrogen gas, which is an inert gas, is supplied into a furnace at a rate of 250 liters/min, the oxygen concentration within the furnace should be calculated as: 0.025 [liter/min]÷250 [liters/min]=100 [ppm] (Equation 1). In view of the fact that the nitrogen gas supplied into the furnace itself also includes a minute amount, i.e., 7 ppm, of oxygen, however, the oxygen concentration within the furnace should mathematically become 100+7=107 [ppm] (Equation 2).

Also, an actual heating furnace was employed for actually measuring the oxygen concentration within the furnace when nitrogen gas was supplied into the furnace at a rate of 250 liters/min. The actually measured value was 110 pm, which nearly coincided with the above-mentioned calculated value 107 ppm. Also, when the calculated value and actually measured value were compared with each other in the cases where the amount of nitrogen gas supply was set to 100, 200, and 500 [liters/min], they nearly coincided with each other.

In the case such as that mentioned above, however, even when the amount of nitrogen gas supply per unit time is changed, the oxygen concentration difference between inside and outside the bellows would not change, whereby 0.025 liter per minute of oxygen always permeates through the bellows. As a result, thus permeating oxygen and a carbon in a carbon-based part within the furnace react with each other, whereby the carbon-based part may deteriorate due to oxidization. Here, assuming the volume of the gas to be 22.4 liters per 1 mol in the standard temperature and pressure, and the mass of carbon to be 12 g per 1 mol, the reacting mass of the carbon in the carbon-based part consumed per 100 hours is calculated as: 0.025 [liter/min]÷22.4 [liters/mol]×12 [g/mol]×60 [min/hour]×100 [hours]=80.4 [g].

Under the above-mentioned condition, it is not negligible that the 80 g carbon in the carbon-based part is consumed by oxidization every 100 hours, whereby the carbon-based part is needed to be replaced every 100 hours. Not only it takes much time and labor to replace such carbon-based parts as the heater 7 and muffle tube 9, but also a high cost is incurred for the replacement. Also, after the replacement, an initial operation is needed until the glass rod 1 having a constant quality can be elongated, thus necessitating further cost and time therefor. As a result, the operation rate of the furnace would also decrease.

Figure 2:
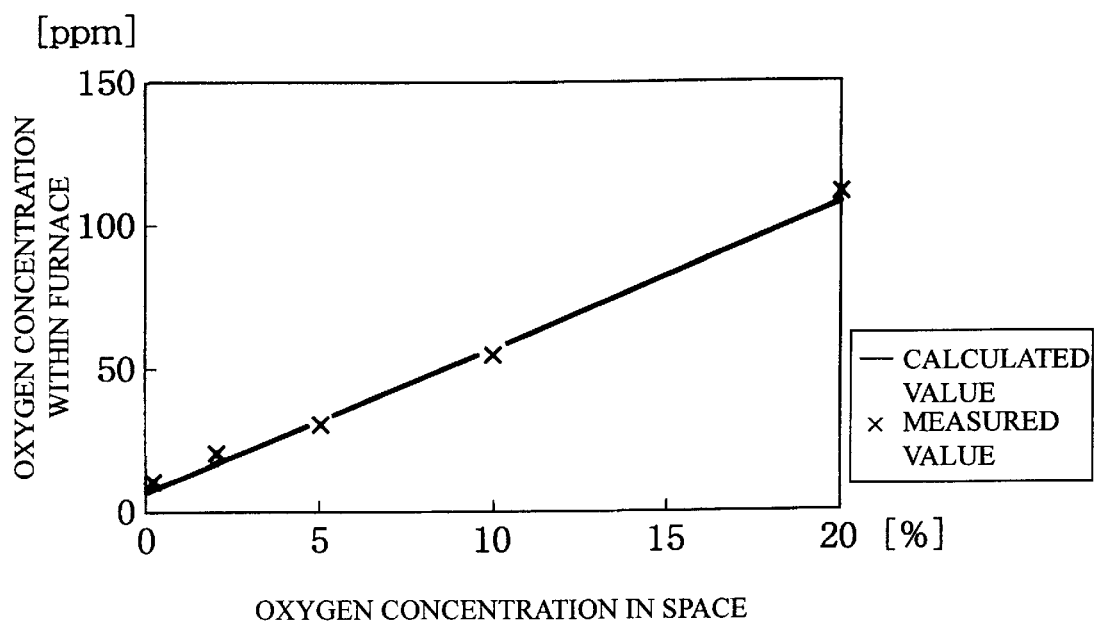
FIG. 2 is a graph showing a relationship between oxygen concentration in a space between components of an expandable member and oxygen concentration within a furnace.

Studied in the following is the case where, as with the apparatus shown in FIG. 1, the bellows has a double structure comprising the inner bellows 6A and the outer bellows 6B, while the oxygen concentration in the space S2 formed therebetween is lowered. The oxygen concentration in the furnace inner section S1 was calculated in a manner similar to the above-mentioned Equations 1 and 2 in the cases where the oxygen concentration in the space S2 between the inner bellows 6A and the outer bellows 6B was changed to various values while the amount of nitrogen gas supply to the furnace inner section S1 was fixed at 250 liters/min. Thus calculated values are plotted as a line on the graph of FIG. 2.

Also, an actual heating furnace was employed for actually measuring the oxygen concentration in the furnace inner section S1 in the cases where the oxygen concentration in the space S2 was set to 20, 10, 5, 2, and substantially zero [%]. Thus actually measured values are plotted as "x" on the graph of FIG. 2. As can be seen from the graph of FIG. 2, the calculated values substantially coincide with their corresponding measured values, thus indicating that the oxygen concentration in the furnace inner section S1 decreases as the oxygen concentration in the space S2 is lowered. Namely, when the bellows is doubled, and the oxygen concentration in the space S2 is lowered, the amount of oxygen permeation to the furnace inner section S1 can be decreased.

From a permissible amount of a carbon-based part consumption, a permissible amount of oxygen permeation to the furnace inner section S1 is inversely calculated as 0.0025 liter/min or less. In a manner similar to the above-mentioned Equations 1 and 2, the oxygen concentration in the furnace inner section S1 for satisfying this condition is calculated as 17 ppm or less when the amount of nitrogen gas supply is 250 liters/min, and 19.5 ppm or less when the amount of nitrogen gas supply is 200 liters/min. Since the typical amount of an inert gas (nitrogen gas) supply is 250 liters/min, the amount of the carbon-based part consumption would fall within the permissible range when the oxygen concentration in the furnace inner section S1 is 20 ppm or less in this case. The oxygen concentration in the space S2 at which the oxygen concentration in the furnace inner section S1 becomes 20 ppm or less when the typical amount of an inert gas (nitrogen gas) supply is 250 liters/min would inversely be calculated as 2% or less (see the graph of FIG. 2).

While inexpensive nitrogen gas is generally used as the inert gas to be supplied to the furnace inner section S1, the nitrogen gas itself contains oxygen by a minute amount of about 7 ppm as mentioned above. Consequently, when the amount of nitrogen gas supply is increased, oxygen, though a minute amount, would also be supplied. Hence, when the amount of nitrogen gas supply is too much, oxygen contained in the nitrogen gas would promote deterioration of carbon-based parts, thereby yielding an adverse effect. When the amount of nitrogen gas supply is too small, by contrast, the convolution of oxygen from the opening 52 would increase, thereby promoting deterioration of carbon-based parts. Though depending on the volume of the furnace inner section S1 or opening area of the opening 52, the amount of nitrogen gas supply that would not generate these inconveniences falls within the range of about 50 to 500 liters/min, and is about 250 liters/min in general.

In order to verify the effects of the present invention, the inventors carried out several comparative tests. These comparative tests will now be explained.

Test Example 1

The heating furnace shown in FIG. 1 was employed for measuring the amount of carbon-based parts consumption within the furnace. Nitrogen gas was supplied to the furnace inner section S1 at 250 liters/min for purging, and to the space S2 such that the oxygen concentration therein became 0.2% or less. In this state, the oxygen concentration in the furnace inner section S1 before a temperature rise was 10 ppm. Then, the heating was effected by the heater 7 to raise temperature, and while the temperature in the space within the heater was kept at 1900° C., the furnace was left for 10 hours. Thereafter, the furnace was disassembled, and the state of deterioration of the carbon-based parts was investigated. As a result, no deterioration was found in the carbon-based parts, and there was no change in weight of the carbon-based parts.

Comparative Example 1

A heating furnace which differed from the heating furnace used in the above-mentioned Test Example 1 only in that the bellows was not a double structure was subjected to a comparative test similar to Test Example 1. Namely, this comparative test was carried out under the test condition identical to that in the above-mentioned Test Example 1 except that the bellows was not a double structure. Here, the outside of the bellows was normal air, which has an oxygen concentration of about 20%. In this state, the oxygen concentration in the furnace inner section before the temperature rise was 110 ppm. Also, when the heating furnace was disassembled to investigate the state of deterioration of the carbon-based parts, their surfaces were found to be rough, and the weight of the carbon-based parts was reduced by 8 g. Of the carbon-based parts, the positions near the bellows where the temperature became higher deteriorated most severely.

These results confirmed that the carbon-based parts in the furnace inner section S1 could be restrained from deteriorating when the space S2 was formed and its oxygen concentration was kept low. It was also confirmed that the deterioration of carbon-based parts was greatly influenced by oxygen permeation through the bellows.

Comparative Example 2

A comparative test was carried out under the test condition different from that of the above-mentioned Comparative Example 1 only in that the amount of nitrogen gas supplied to the furnace inner section was changed to 500 liters/min. Namely, the test condition in this comparative example was identical to that in the above-mentioned Comparative Example 1 except that the amount of nitrogen gas supply was set to 500 liters/min. In this state, the oxygen concentration in the furnace inner section before the temperature rise was 57 ppm. When the heating furnace was disassembled to investigate the state of deterioration of carbon-based parts, the state was similar to that in the case of Comparative Example 1, and the weight of the carbon-based parts decreased by 8 g.

These results indicate that the deterioration of carbon-based parts is influenced more by the amount of oxygen permeation through the bellows than by the initial oxygen concentration in the furnace inner section.

Test Example 2

The heating furnace shown in FIG. 1 was employed for elongating a glass rod 1 having an outer diameter of 70 mm and a length of 1000 mm such that the outer diameter became 40 mm. Here, no coolant circulation was provided for the expandable muffle tube 8, which was made of curbon. The other conditions were the same as those in the above-mentioned Test Example 1. When measured in the vicinity of the upper tapered portion of the glass rod 1 during the elongating of the glass rod 1, the temperature of the inner bellows 6A was 120° C. Since the inner bellows 6A had a heat resistance to a temperature of 200° C., there was no damage, whereby the glass rod 1 could be elongated without any problem.

Test Example 3

The heating furnace shown in FIG. 1 was employed for elongating a glass rod 1 having an outer diameter of 165 mm and a length of 1000 mm such that the outer diameter became 120 mm. Here, a coolant circulation was provided for the expandable muffle tube 8, which was made of metal. The other condition were the same as those in the above-mentioned Test Example 2. When measured in the vicinity of the upper tapered portion of the glass rod 1 during the elongating of the glass rod 1, the temperature of the inner bellows 6A was 30° C. (room temperature). It was thus confirmed that providing the expandable muffle tube 8 and circulating a coolant with respect to the expandable muffle tube 8 was effective in lowering the temperature of the inner bellows 6A.

Comparative Example 3

Figure 3:
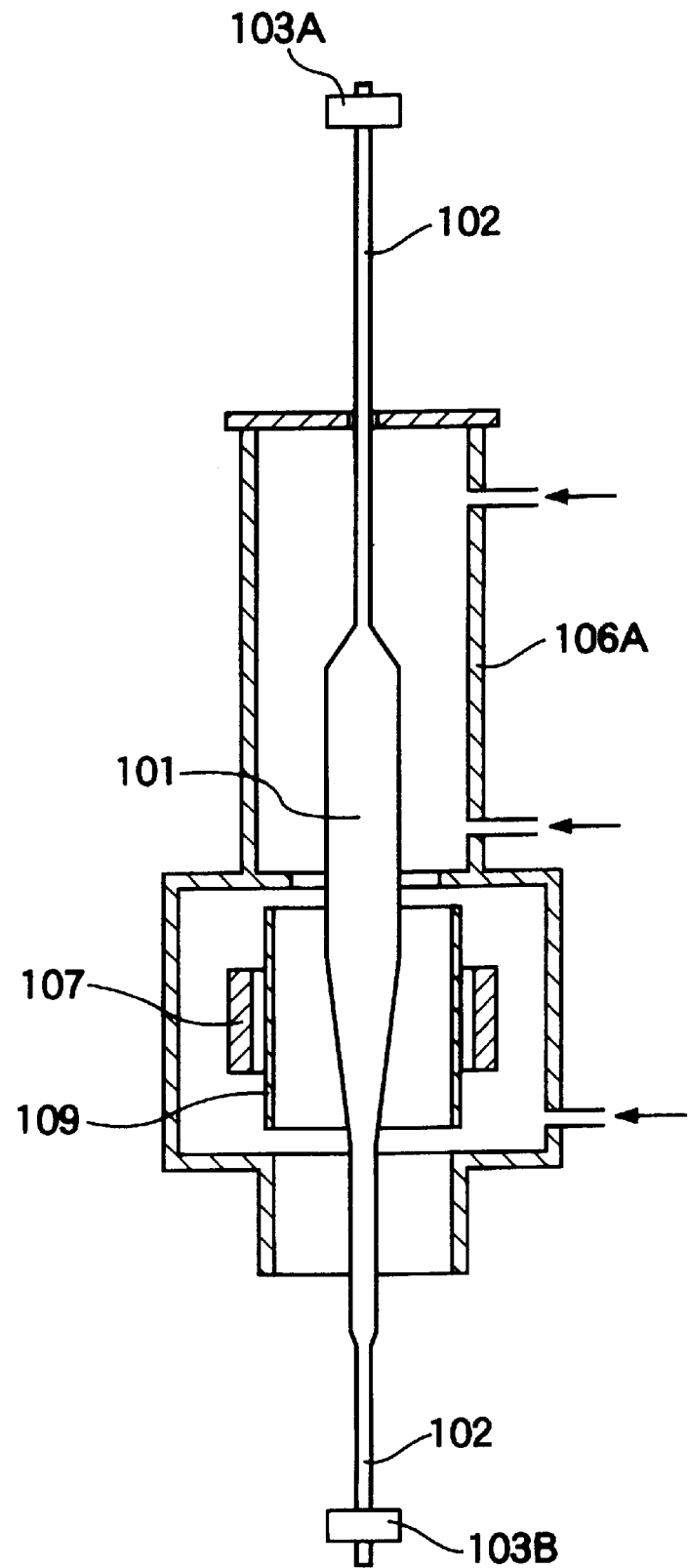
FIGS. 3 and 4 are sectional views of conventional heating furnaces for elongating glass rods showing, respectively, systems with and without a bellows.
Figure 4:
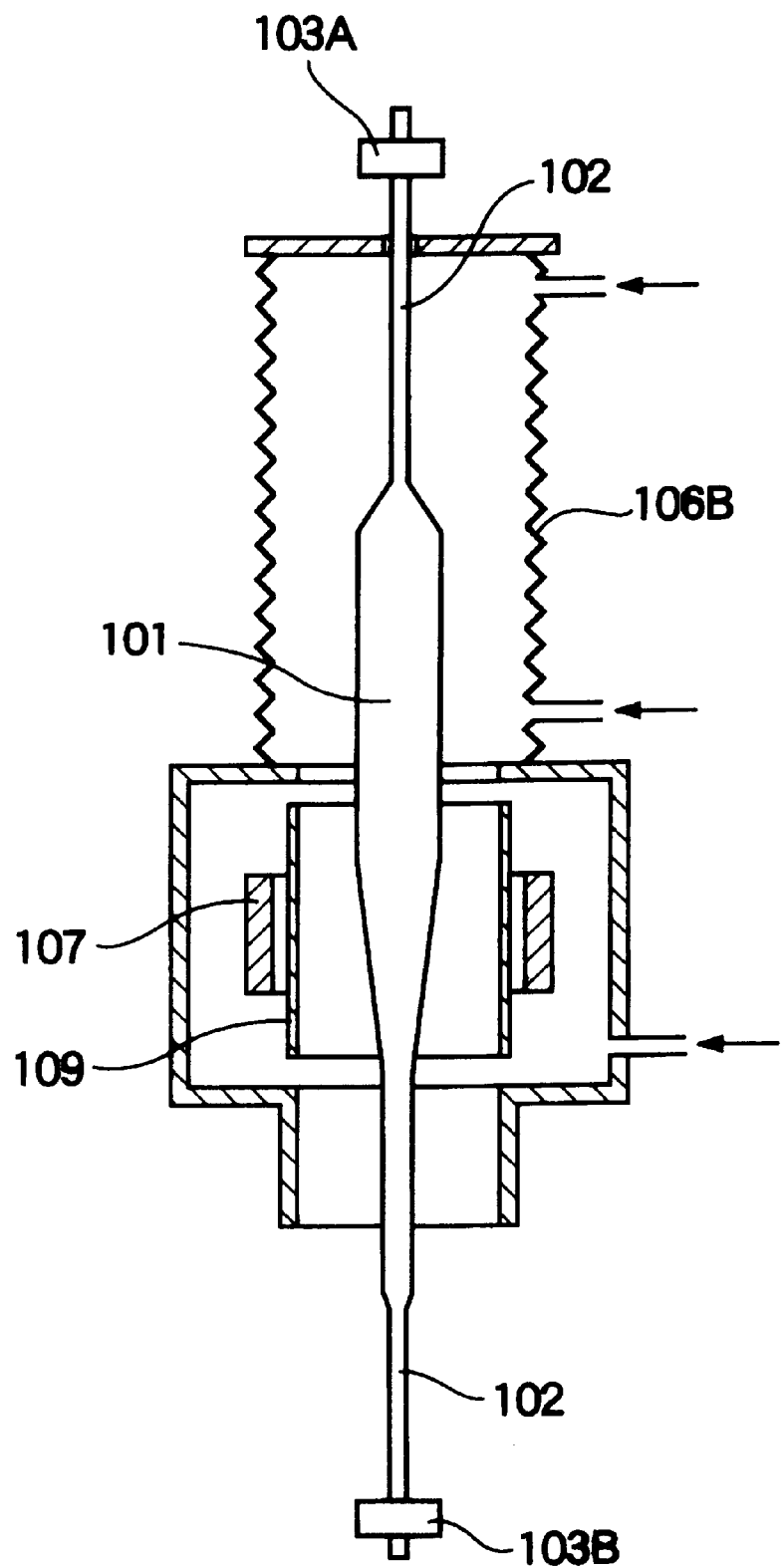

The heating furnace shown in FIG. 3 was employed for carrying out a test similar to the above-mentioned Test Example 3. The heating furnace shown in FIG. 3 differed from that shown in FIG. 1 only in that the movable area of the upper chuck 103A was so wide that the upper dummy rod 102 was elongated, that the cylindrical portion 106A was provided in place of the inner bellows 6A and outer bellows 6B, and that no part corresponding to the expandable muffle tube 8 was provided. The other conditions were the same as those of the above-mentioned Test Example 3. When measured in the vicinity of the upper tapered portion of the glass rod 1 during the elongating of the glass rod 1, the temperature of the cylindrical portion 106A was as high as 500° C. to 750° C. When such a temperature was yielded, a bellows cannot simply be used in place of the cylindrical portion 106A.

The heating furnace for elongating a glass rod in accordance with the present invention and method of elongating a glass rod in accordance with the present invention should not be restricted to the embodiment mentioned above. For example, though the first gas supplier 10A and the second gas supplier 10B are provided as the gas supply means in the above-mentioned embodiment, a single gas supplier may be provided alone, such that the amounts of supply of gas to the furnace inner section S1 and space S2 could be controlled independently of each other with a valve. Also, though the upper chuck 3A and the moving portion 4 were provided independently in the above-mentioned embodiment, they may be integrated with each other as well.

Though the heating furnace of the above-mentioned embodiment holds both ends of the glass rod 1 with the aid of dummy rods 2, the heating furnace may also be constituted such that only one end of the glass rod is held, while a linear body such as optical fiber is directly elongated from the other end side. Also, though the glass rod 1 is elongated vertically in the heating furnace of the above-mentioned embodiment, the heating furnace may be constituted such that the glass rod is elongated horizontally as well.

From the invention thus described, it will be obvious that the invention may be implemented in many ways. Such variations are not to be regarded as a departure from the spirit and scope of the invention, and all such modifications as would be obvious to one skilled in the art are intended for inclusion within the scope of the following claims.

What is claimed is:

1. A heating furnace for elongating a glass rod, which holds at least one end of said glass rod with a holding portion and elongates said glass rod by softening said glass rod successively from the other end portion thereof being heating while applying a tensile force thereto, said heating furnace comprising:
a tubular portion through which said glass rod to be elongated is inserted such as to be longitudinally movable;
heating means, positioned within said tubular portion so as to circumferentially surround said glass rod, for heating said glass rod;
a moving portion through which one end of said glass rod is inserted;
an expandable member the ends of which are respectively secured to said moving portion and said tubular portion and which is longitudinally expandable and contractible and comprises a double cylinder surrounding part of said glass rod so as to block outside air from flowing into said heating furnace;

an expandable muffle tube, disposed inside the innermost cylinder of said expandable member, which surrounds said glass rod and expands and contracts in synchronization with the expansion and contraction of said expandable member as said moving portion moves; and gas supply means for supplying and purging an inert gas into a space within said tubular portion and the inner cylinder of said expandable member as well as the space between inner and outer cylinders of said expandable member.

2. A heating furnace for elongating a glass rod according to claim 1, wherein said gas supply means is adapted to independently control the amount of the inert gas supplied to the space within said tubular portion and the inner cylinders of the expandable member and the amount of the inert gas supplied to the space between the inner and outer cylinders of said expandable member.

3. A heating furnace for elongating a glass rod according to claim 1, wherein said gas supply means is adapted to control the amount of the inert gas supplied to the space within said tabular portion and the inner cylinders of the expandable member and/or the amount of the inert gas supplied to the space between the inner and outer cylinders of said expandable member in response to the expansion and contraction of said expandable member.

4. A heating furnace for elongating a glass rod according to claim 1, wherein a water passage for guiding a coolant is formed within or on a surface of said expandable muffle tube, said water passage being connected to a circulation mechanism for circulating said coolant.

* * * * *